United States Patent [19]

Lutz et al.

[11] Patent Number: 4,970,373
[45] Date of Patent: Nov. 13, 1990

[54] ELECTRONIC TEMPERATURE CONTROL SYSTEM FOR A TANKLESS WATER HEATER

[75] Inventors: Kenneth E. Lutz, Hickory Corners; Ralph S. Robertson, Delton, both of Mich.

[73] Assignee: Keltech, Inc., Richland, Mich.

[21] Appl. No.: 448,736

[22] Filed: Dec. 11, 1989

[51] Int. Cl.⁵ .............................................. H05B 1/02
[52] U.S. Cl. ................................... 219/497; 219/492; 219/494; 219/501; 219/508; 323/908
[58] Field of Search ............... 219/483, 490, 492, 494, 219/501, 497, 499, 505, 506, 507–509, 330, 331; 323/235, 236, 319, 908; 307/117

[56] References Cited

U.S. PATENT DOCUMENTS

| | | | |
|---|---|---|---|
| 3,514,580 | 5/1970 | Brockway | 219/501 |
| 3,789,190 | 1/1974 | Orosy et al. | 219/501 |
| 3,821,516 | 6/1974 | Hayes et al. | 219/499 |
| 3,903,395 | 9/1975 | Hamstra | 219/497 |
| 3,946,200 | 3/1976 | Juodikis | 219/499 |
| 4,078,168 | 3/1978 | Kelly | 219/497 |
| 4,167,663 | 9/1979 | Granzow, Jr. et al. | 219/497 |
| 4,334,147 | 6/1982 | Payne | 219/497 |
| 4,337,388 | 6/1982 | July | 219/309 |

*Primary Examiner*—M. H. Paschall
*Attorney, Agent, or Firm*—Harness, Dickey & Pierce

[57] ABSTRACT

A closed loop, electronic temperature control system for a tankless water heater. The control system incorporates error range comparison circuitry for comparing the difference between a water temperature selected from a temperature selection device and an actual water temperature sensed by a temperature sensing device. An error range comparison circuit operates to select a high gain when the sensed water temperature is within about +/−3° Fahrenheit of the selected temperature, and a low gain when the sensed water temperature is more than +/−3° Fahrenheit of the selected water temperature. A slow start network is included for applying current gradually to the heating element of the water heater when power is initially applied to the system. A master power down circuit quickly interrupts current flow to the heating element after the system has been powered down.

16 Claims, 6 Drawing Sheets

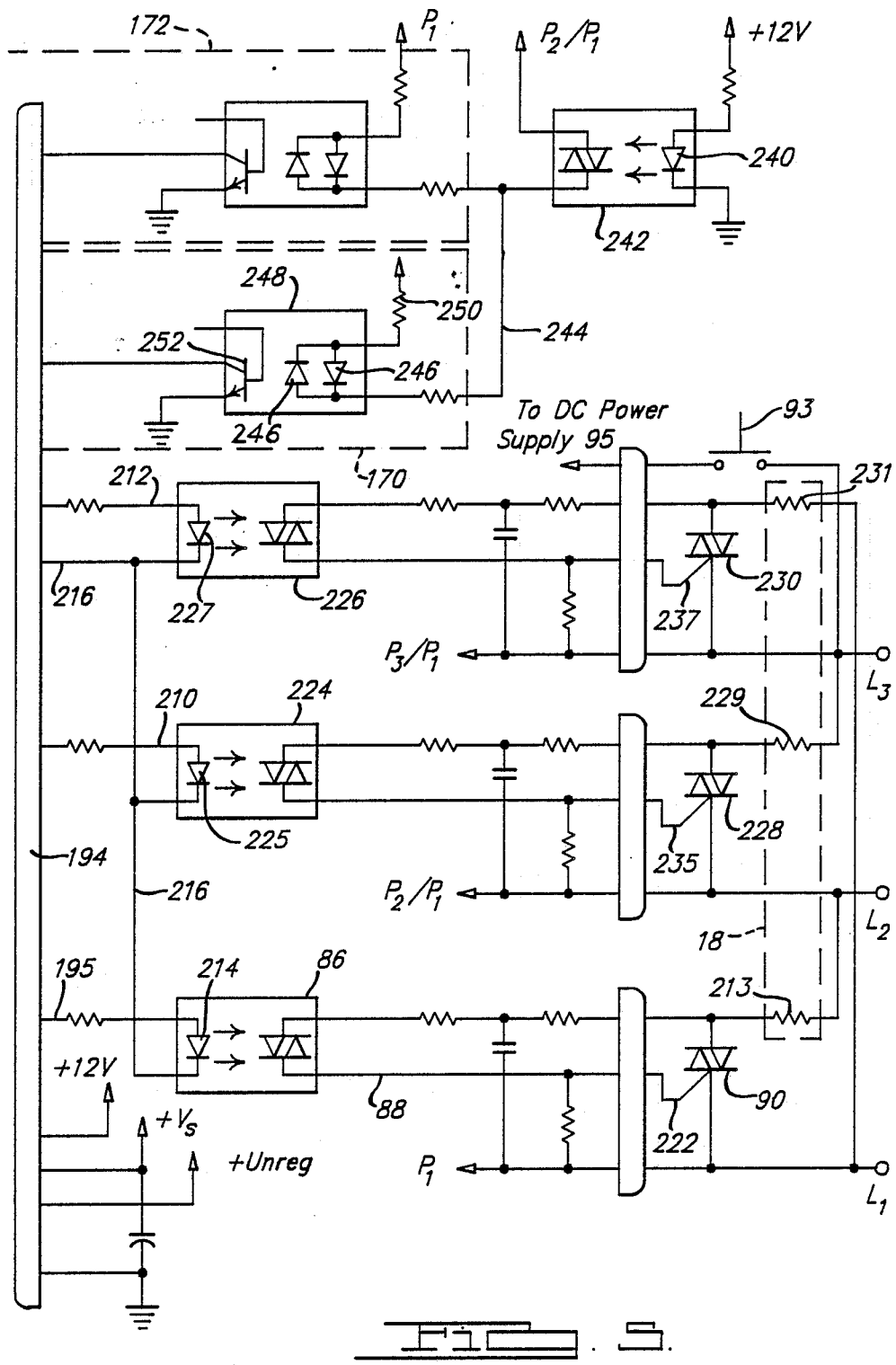

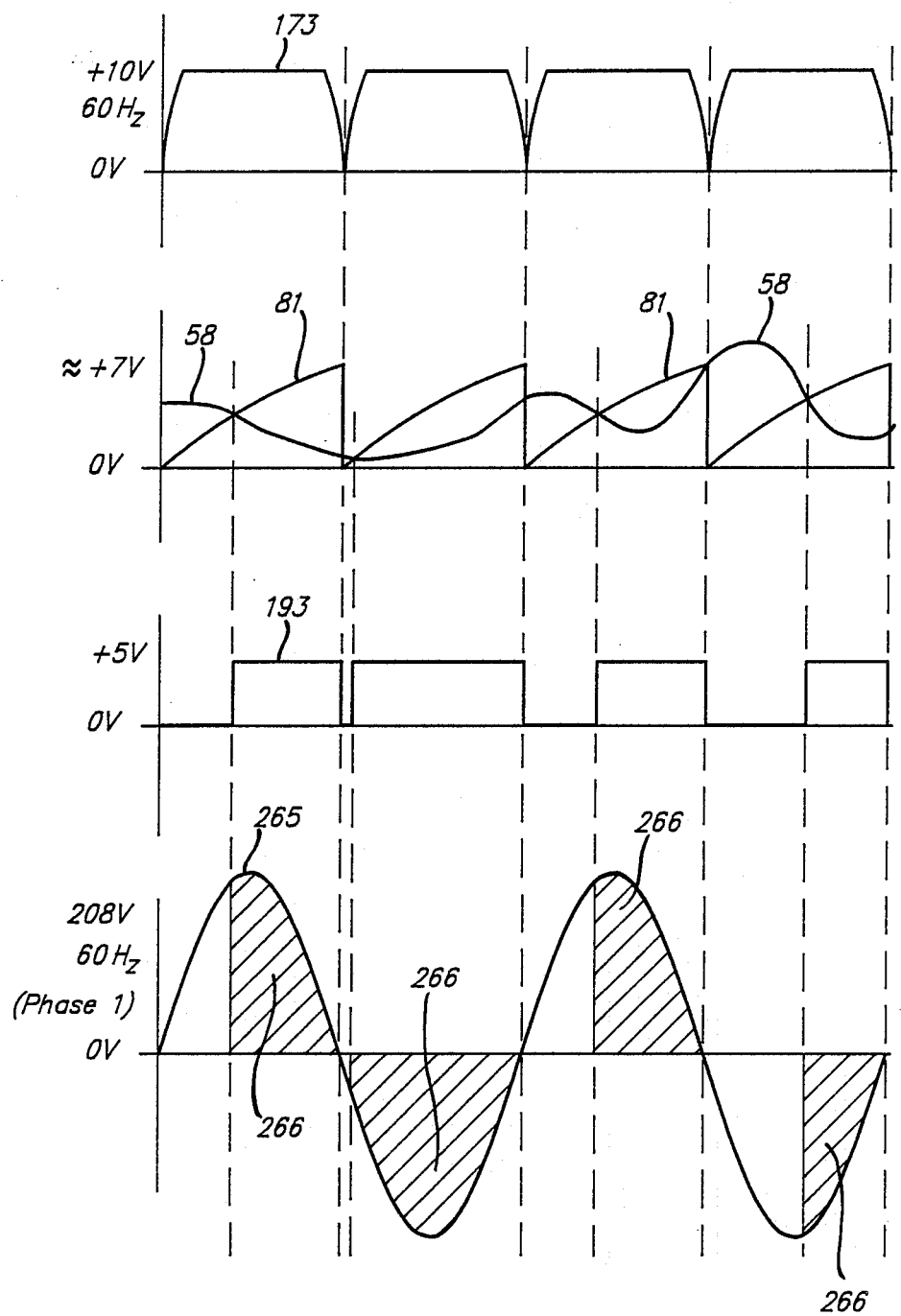
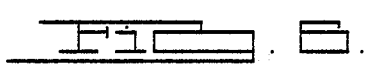

ELECTRONIC TEMPERATURE CONTROL SYSTEM FOR A TANKLESS WATER HEATER

BACKGROUND OF THE INVENTION

1. Technical Field

This invention relates to closed loop, electronic temperature control systems and, particularly to an electronic temperature control system for closely regulating the temperature of water discharged from a tankless water heater.

2. Discussion

Water heating devices are used for a variety of residential and industrial purposes. One particular type of water heating device, and probably the most common in use at the present time, is the conventional hot water tank system. With this system, water is pumped into a hot water holding tank and heated to a relatively high temperature, for example, 150°-180° Fahrenheit. If a particular use or application requires that the temperature of the water being used be less than the temperature at which the water tank is maintaining the water, then water from a cold water line must be added to the hot water discharged from the hot water tank to reduce the temperature of the heated water to the desired temperature level.

The conventional hot water tank system described above has numerous disadvantages. Probably the greatest disadvantage occurs when cold water is added to the heated water being discharged from the hot water tank to bring the overall temperature of the water down to the desired level. This results in a significant loss of energy in the form of heat dissipation from the hot water tank and additional heat dissipation to the environment through supply conduits between the hot water tank and the water outlet.

A less commonly used water heating device is a tankless, or "point-of-source", water heater. With the tankless water heater, incoming ground water passes through a component generally known as a heat exchanger and is instantaneously heated by heating elements within the heat exchanger until the temperature of the water leaving the heat exchanger matches a desired temperature set by a user of the system. With such systems the heat exchanger is typically heated by a large current flow which is regulated by an electronic control system. The electronic control system also typically includes a temperature selection device, such as a thermostat, by which the user of the system can select the desired temperature of the water being output from the heat exchanger.

A tankless water heater provides significant advantages over conventional hot water tank systems. One such advantage is the improvement in efficiency which the tankless water heater provides. Since energy in the form of heat is applied only when needed, i.e., only when hot water is desired, the energy loss which would otherwise occur in a conventional hot water tank system is avoided.

Although present day tankless water heating devices offer significant improvements over conventional hot water tank systems in terms of efficiency, applications exist where more improved regulation of the actual temperature of the output water is required. For example, the temperature of water used in photo-processing applications must be regulated closely to within a couple of degrees Fahrenheit of a set temperature. Such precise temperature control would require an electronic control system capable of "tracking" very closely a desired temperature selected by the user. The temperature control of present tankless water heaters can be affected to an unacceptable degree by varying flow rates and other factors, making them unsuited for temperature-critical applications.

Another disadvantage of present day tankless heating devices is the stress produced on heating elements within the heat exchanger when the heater is initially powered on, and full power is instantly applied to the heating elements. Current spikes can also occur under certain circumstances when power is removed from the system controlling the heat exchanger, and full power is applied to the heat exchanger. Such an instantaneous application of full power, which may range up to about 75 amps or more, can produce significant stress on the heating elements thus shortening their lives and compromising the durability of the device. The current spikes generated can also damage other electrically driven devices and equipment such as transformers of the utility supplying the power.

It is thus principal object of the present invention to provide an electronic temperature control system capable of more closely and accurately regulating the temperature of water output from a tankless water heating device.

It is a further object of the present invention to provide an electronic temperature control system which is capable of applying power gradually to heating elements of a heat exchanger within the tankless water heater when the heater is initially powered on, thus eliminating large current spikes that could otherwise result if full power was applied instantaneously to the heating elements.

It is still another object of the present invention to provide an electronic temperature control system operable to quickly interrupt the current being supplied to the heating elements within the device when the device is powered down, thus eliminating current spikes which could otherwise result if power was gradually removed from the system.

It is still another object of the present invention to provide an electronic temperature control system operable to controllably modulate the current flow to the heating elements within the heating device so as to apply current to the heating elements only when needed.

SUMMARY OF THE INVENTION

The above and other objects are provided by an electronic temperature control system in accordance with the present invention. The system includes a temperature sensing device for enabling sensing of a temperature level of a liquid to be temperature controlled. A temperature selection device for enabling selection of a desired temperature level of the liquid is also included.

An error signal generating amplifier receives signals generated by the sensing and selection devices and generates an error signal representative of a difference between the selected and sensed temperature levels. An error range comparison circuit provides an error range which corresponds to a predetermined, maximum desirable temperature level error range and compares the error signal with the predetermined error range. The error range comparison circuit provides a high gain selection signal when the error signal is within the predetermined error range and a low gain selection signal when the error signal is outside of the predetermined error range.

High and low gain elements provide high and low gain signals respectively in cooperation with a system reference signal. The high and low gain signals are coupled to a digital switch which selectively couples one or the other gain signal, in accordance with the high or low gain selection signal, to an amplifier. A system reference signal is also coupled to the amplifier and together with the high or low gain signal helps generate a conditioned correction signal having either a high or low gain.

The conditioned correction signal is input to a first switching circuit where it is continuously compared against a ramp reference signal. The first switching circuit modulates a switch between on and off positions, which in turn allows current from an AC generator to flow through a heating element in fluid contact with the liquid to be heated. The modulated current flow then heats the heating element in a controlled on and off manner to heat and precisely regulate the temperature of the liquid in fluid contact with the heating element.

In a preferred embodiment, the invention incorporates a slow start ramp network for gradually applying current to the heating element when the heating device is first powered on, thus eliminating current spikes which could result when the unit is first powered on and a large current is initially applied to the heating element.

A preferred embodiment also incorporates a master power down circuit for quickly disabling current flow through the heating element to eliminate any current spikes which could result when power is removed from the system.

BRIEF DESCRIPTION OF THE DRAWINGS

The various advantages of the present invention will become apparent to one skilled in the art by reading the following specification and subjoined claims and by referencing the following drawings in which:

FIG. 5 is a schematic diagram of the photo-electric triacs for a three-phase system and their associated master power triacs, as well as the phase reference triac and the remaining parts of the second and third switching circuits; and FIG. 6 is an illustration of the various waveforms generated by the system in controlling the current flow to the heat exchanger.

DETAILED DESCRIPTION OF THE PREFERRED EMBODIMENTS

Figure 1:
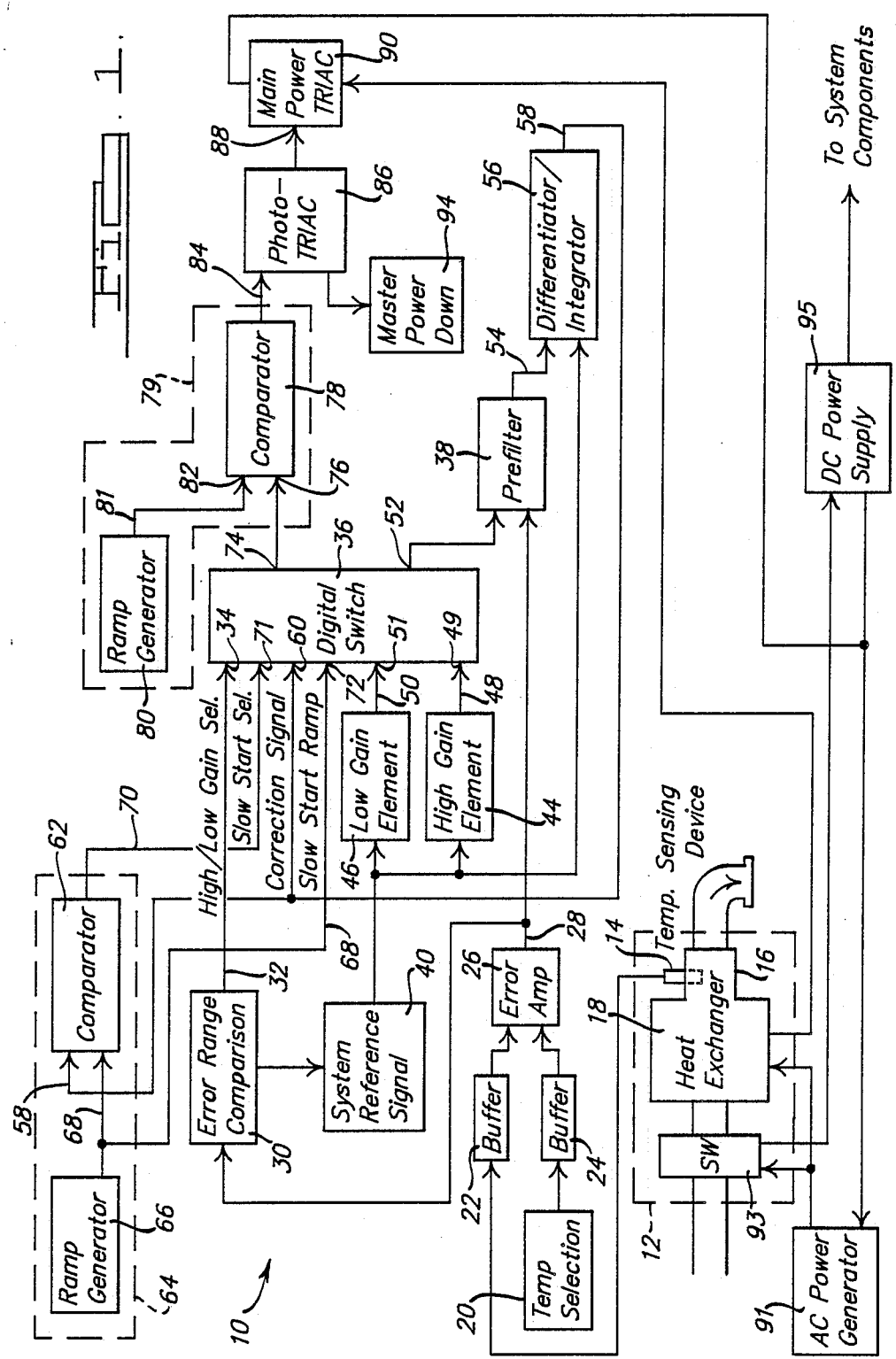
FIG. 1 is a simplified block diagram of the electronic temperature control system of the present invention and a highly simplified block diagram of a tankless water heater with which the present invention is used.

In FIG. 1 a simplified block diagram of a closed loop, electronic temperature control system 1 in accordance with the present invention is shown with a tankless water heater 12. It should be understood initially that FIG. represents a simplified block diagram of the system 10 configured to operate with a single-phase power system. Alternatively, the system 10 could be easily configured to operate with a three-phase power system, as will be shown in FIGS. 2-5.

The system 10 includes a temperature sensing device 14 disposed partially within an output port 16 of a heat exchanger 18 of the water heater 12. A temperature selection device 20 is also provided for allowing user selection of a desired water temperature. The outputs of the temperature sensing device 14 and the temperature selection device 20 are coupled through buffers 22 and 24 respectively to an error amplifier 26.

The error amplifier generates an error signal output 28 which is input to an error range comparison circuit 30. The error range comparison circuit 30 generates an output signal 32 which represents a high/low gain selection signal, which is output to a first selection input 34 of a digital switch 36.

The error signal 28 of the error amplifier 26 is also output to a prefilter 38. A system reference signal 40, acting as a level shifter, and in connection with either a high gain element 44 or a low gain element 46, helps to provide either a high gain signal 48 to input 49 of switch 36 or a low gain signal 50 to input 51 of an associated output 52 of the switch 36. Output 52 of the switch 36 is then coupled along with error signal 28 to the prefilter 38, which generates an amplified correction signal 54 having either a high or a low gain. The operation of selectively coupling either high gain element 44 or low gain element 46 through switch 36 to the prefilter 38 will be discussed in detail momentarily and also in connection with FIGS. 2 and 3.

The amplified correction signal 54 is input together with system reference signal 40 to a differentiator/integrator 56 operable to generate a conditioned correction signal 58. The conditioned correction signal 58 is then output to an input 60 of the digital switch 36 and to a comparator 62 of a slow start ramp network 64. The comparator 62 also receives from a ramp generator 66 within the ramp network 64 a ramp output 68, which is also coupled to an input 72 of the digital switch 36. The comparator 62 generates a slow start selection signal 70 which is output to a selection input 71 of the digital switch 36. The slow start selection signal 70, in cooperation with the digital switch 36, operates to select either the slow start ramp output 68 or the conditioned correction signal 58 and to couple the selected output 58 or 60 to an associated output 74 of the digital switch 36.

Output 74 of the digital switch is then coupled to a first input 76 of a comparator 78 of a first switching circuit 79. The comparator 78 also receives from a ramp generator 80 a ramp reference signal 81 on its second input 82. The comparator 78 provides a switching output 84 made up of a train of pulses of varying pulse widths to a photo-triac 86. Photo-triac 86 is then coupled to a gate 88 of a main power triac 90 which couples an AC power generator 91 with the heat exchanger 18. Also coupling the AC generator 91 to the heat exchanger 18 is a water flow responsive switch 93. The switch 93 further serves to couple AC power to a DC power supply 95. In the preferred embodiment the switch 93 is a pressure differential microswitch which operates to switch to a closed position in response to a water flow through the water heater 12.

In operation, the system 10 uses the temperature sensing device 14 to sense and monitor the actual or real-time temperature of the water being discharged from the heat exchanger 18. This signal is compared with the desired water temperature selected from the temperature selection device 20 and the difference between the two is amplified by the error amplifier 26 to produce error signal 28, which is representative of the magnitude of the difference between the two signals. The error signal 28 is then compared with upper and lower limits of a predetermined error range in the error range comparison circuitry 30. This feature of the error range comparison circuitry 30 will be discussed in detail in connection with FIG. 2. If the error signal 28 falls within the predetermined error range then the error range comparison circuitry 30 generates output 32, which will represent a high gain selection signal. Output 32 is then coupled to selection input 34 of the digital switch 36 which operates to couple the high gain element 44 to output 52 of the switch. Conversely, if the error signal 28 falls outside of the predetermined error range, output signal 32 will represent a low gain selection signal. When placed on selection input 34 of the digital switch 36, the low gain selection signal operates to couple the low gain element 46 to output 52 of the switch 36. Thus, by comparing the error signal 28 with the predetermined error range and selectively coupling either high gain element 44 or low gain element 46 through switch 36 to the prefilter 38, the gain of the prefilter 38 can be selectively controlled. The prefilter 38 then amplifies the error signal 28 in accordance with the gain provided by either the high gain element 44 or the low gain element 46 to produce the amplified correction signal 54.

The differentiator of the differentiator/integrator circuit 56 operates as a "look-ahead" circuit in connection with the system reference signal 40 to reduce or "trim" the amplified correction signal 54 at times when the signal 54 is changing rapidly. This helps to improve the regulation, or "tracking", of the temperature selection signal selected from the temperature selection device 20. The integrator of the differentiator/integrator 58 operates to take the time integral of the amplified correction signal 54 to produce conditioned correction signal 58, which represents a sinusoidal-like signal of varying frequency and magnitude.

When the system 10 is initially powered on, the initial conditioned correction signal 58 is compared with the slow start ramp signal 68 produced by the slow start ramp generator 66. Initially, the ramp signal 68 will be larger than the conditioned correction signal, which will be explained more fully in the following paragraphs. During the period which the ramp signal 68 is larger than the conditioned correction signal 58, the selection output 70 of the comparator 62 operates to couple, via the digital switch 36, the ramp output 68 with the input 76 of comparator 78. When the conditioned correction signal 58 becomes larger in magnitude then the ramp signal 68, the selection output 70 of the comparator 62 operates to couple, through the digital switch 36, the conditioned correction signal 58 with input 76 of comparator 78. The slow start ramp network 64 thus operates to compare the conditioned correction signal 58 with the ramp signal 68 and to select the ramp signal 68 as the signal to be output while the conditioned correction signal 58 is less than the ramp signal 68. When the conditioned correction signal 58 exceeds the ramp signal 68 in magnitude, the network 64 enables the conditioned correction input 58 to be output through the switch 36 to input 76 of comparator 78. By incorporating the slow start ramp network 64, current spikes or transients which could be generated when the system 10 is first powered up, and a large difference exists between the desired and selected water temperatures, may be eliminated by the gradual application of current in the form of ramp output 68. It should be appreciated, however, that the slow start ramp network 64 is optional and that the system 10 will operate well without it.

The output 74 from the digital switch 36, which represents either the ramp output 68 or the conditioned correction output 58, is then compared against the ramp reference signal 81 of the ramp generator 80 by the comparator 78. While the ramp reference signal 81 is greater in magnitude than the signal from output 74 of digital switch 36, the output signal 84 of the comparator 78 is such as to enable, or switch on, photo-triac 86. Photo-triac 86 will in turn switch on the main power triac 90, thus allowing current to flow to and from the heat exchanger 18. When the signal on input 76 of the comparator exceeds that of the ramp reference signal 81, the output 84 of comparator 78 operates to switch and hold off the photo-triac 86, thus switching and holding off the main power triac 90 to interrupt current flow to and from the heat exchanger 18. Interrupting current flow to the heat exchanger 18 allows it to cool, thus allowing water passing through it to also begin cooling. Specific details of the operation of the ramp generator 80, the comparator 78, the photo-triac 86 and the main power triac 90 will all be discussed further in connection with FIGS. 2-5.

When the system 10 is powered down, the master power down circuitry 94 operates to help prevent current spikes that could result when power to the system 10 is removed and the supply voltages produced by the system 10 decrease gradually in a ramp-like fashion to zero volts. This feature of the present invention will also be discussed further in the following paragraphs.

Figure 2:
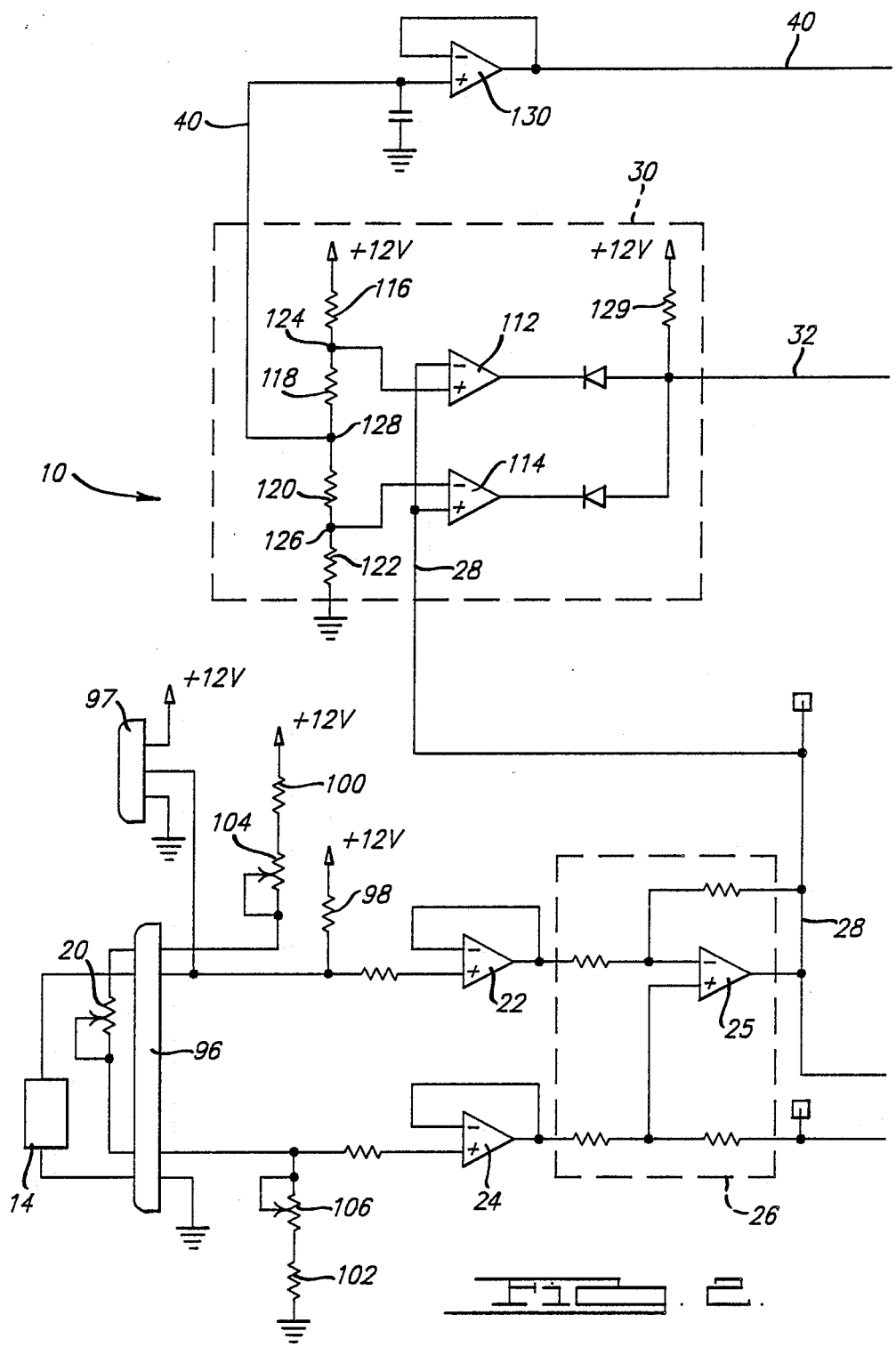
FIG. 2 is a schematic diagram of the temperature selection and sensing devices, the differential amplifier and the error range comparison circuitry.

Referring now to FIGS. 2-5, a detailed schematic diagram of the closed loop control system 10 of the present invention is shown. While FIGS. 2-5 illustrate a preferred embodiment for use with a three-phase power system, it should be understood that the system 10 could easily be modified to operate with a single-phase power system if so desired. Referring first to FIG. 2, the temperature sensing device 14 is connected through a connector 96 to an auxiliary connector 97 and in a voltage divider arrangement with resistor 98 to buffer 22. Buffer 22 is then connected to the inverting input of an operational amplifier 25 of the error amplifier 26. For simplicity, the heat exchanger 18 of FIG. 1, which would normally partially house the temperature sensing device 14, has not been illustrated in FIG. 2. In the preferred embodiment, the temperature sensing device is a precision, integrated circuit temperature sensor commercially available from the National Semiconductor Corporation under Product No. LM34. This sensor is particularly desirable because it produces an output voltage linearly proportional to the Fahrenheit temperature it senses. It further requires no external calibration or trimming to provide a typical accuracy of $+/-1\frac{1}{2}°$ F. from $-50°$ F. to $+300°$ F. This sensor also provides a low output impedance which makes it particularly easy to interface with a temperature read-out display, which could optionally be connected to auxiliary connector 97. If so desired, however, a thermistor could be incorporated in lieu of the precision, integrated circuit temperature sensor.

The temperature selection device 20 is illustrated as a potentiometer and allows a user of the system to select a desired temperature ranging from about 42°–52° F., which is the approximate temperature of ground water, up to at least about 160°–170° F. This is accomplished by configuring the potentiometer 20 in a voltage divider arrangement with resistors 100 and 102 and potentiometers 104 and 106. When the potentiometer 20 is set to its maximum resistance setting, the voltage drop across resistors 106 and 102 collectively will be at a minimum predetermined value, as will be the voltage input to the non-inverting input of buffer 24. Conversely, when the potentiometer 20 is set to its minimum resistance value the voltage drop across resistors 106 and 102 collectively, and thus the voltage input to buffer 24, will be at a maximum predetermined value The maximum predetermined voltage value is calibrated to correspond to the maximum voltage output of the temperature sensing device 14, scaled down by a fixed value by resistor 98, by adjusting potentiometer 106 while the temperature selection potentiometer 20 is set at its maximum resistance value. The minimum predetermined voltage similarly corresponds to the minimum voltage output by the temperature sensing device 14, i.e., that voltage which is generated by the device 14 when sensing the temperature of unheated ground water, scaled down by resistor 98. The minimum predetermined voltage is calibrated by adjusting potentiometer 104 while temperature selection potentiometer 20 is at its maximum resistance value to provide a collective voltage drop across resistor 102 and potentiometer 106 which corresponds to the voltage being generated by the sensing device 14. In this manner the temperature selection device 20 allows a user of the system 10 to select a temperature level at any point within the temperature band in which the temperature sensing device 14 is capable of operating.

After the sensing device 14 and adjustment potentiometer 20 signals are buffered by buffers 22 and 24 respectively, they are input to the differential amplifier 26 where their difference is amplified The output of the differential amplifier 26 represents error signal 28, which is &:hen input to the inverting input of an upper limit comparator 112 and the non-inverting input of a lower limit comparator 114 of the error range comparison circuitry 30. Circuitry 30 also includes resistors 116, 118, 120 and 122 configured in a voltage divider arrangement to provide a fixed, maximum desirable temperature error range corresponding to about +/−3° F. against which the error signal 28 may be compared. The upper limit of the error range is represented by the voltage at point 124 with respect to ground while the lower limit is the voltage present at point 126 with respect to ground. In the preferred embodiment, this error range corresponds to about 6.2 volts to about 5.8 volts, with the midpoint 128 of the error range having a voltage of about 6 volts with respect to ground. The upper level error limit, i.e., point 124, is coupled to the non-inverting input of the upper limit comparator 102 while the lower level error limit, i.e., point 126, is coupled to the inverting input of the lower limit comparator 114. When the error signal 28 is input to the comparators 112 and 114, the error signal 28 is compared against the voltage error range defined by the upper and lower voltage limits, i.e., 6.2 and 5.8 volts respectively. If the error signal 28 is above 6.2 volts, comparator 112 provides an upper limit, logic zero output, thus pulling the output 32 of the error range comparison circuitry 30 down to a logic zero level. Similarly, if the error signal 28 is below the 5.8 volt lower limit, the lower limit comparator 114 provides a lower limit logic zero output which also operates to pull down the output 32 of the comparison circuitry 30 to a logic zero level. When the error signal 28 is within the 6.2–5.8 volt range, however, both comparators 112 and 114 provide upper and lower limit outputs having logic one levels, thus allowing pull-up resistor 129 and the +12 volts applied to it to hold the output 32 at a logic one level.

Thus, the error range comparison circuitry 30 functions to compare the difference between the actual temperature of the water being sensed by the sensing device 14 and the desired temperature selected via potentiometer 20. If the sensed temperature is equal to the desired temperature, the error signal represents a voltage of about 6 volts which produces an output 32 having a logic one level. If the difference between the desired and selected temperature is very small, i.e., within about +/−3° F., the error signal 28 will only vary between about 6.2 and 5.8 volts, thus maintaining the output 32 of the comparison circuitry 30 at a logic one level. If the desired and selected temperatures vary more than about +/−3° F., however, then the error signal 28 represents a voltage having a value either greater than about 6.2 volts or less than about 5.8 volts, causing the comparison circuitry 30 to generate an output 32 having a logic zero level. It should be appreciated that the specific voltages mentioned have been used only for purposes of illustration, and that other voltage ranges could be easily obtained by varying the values of the resistors used in comparison circuitry 30.

Figure 3:
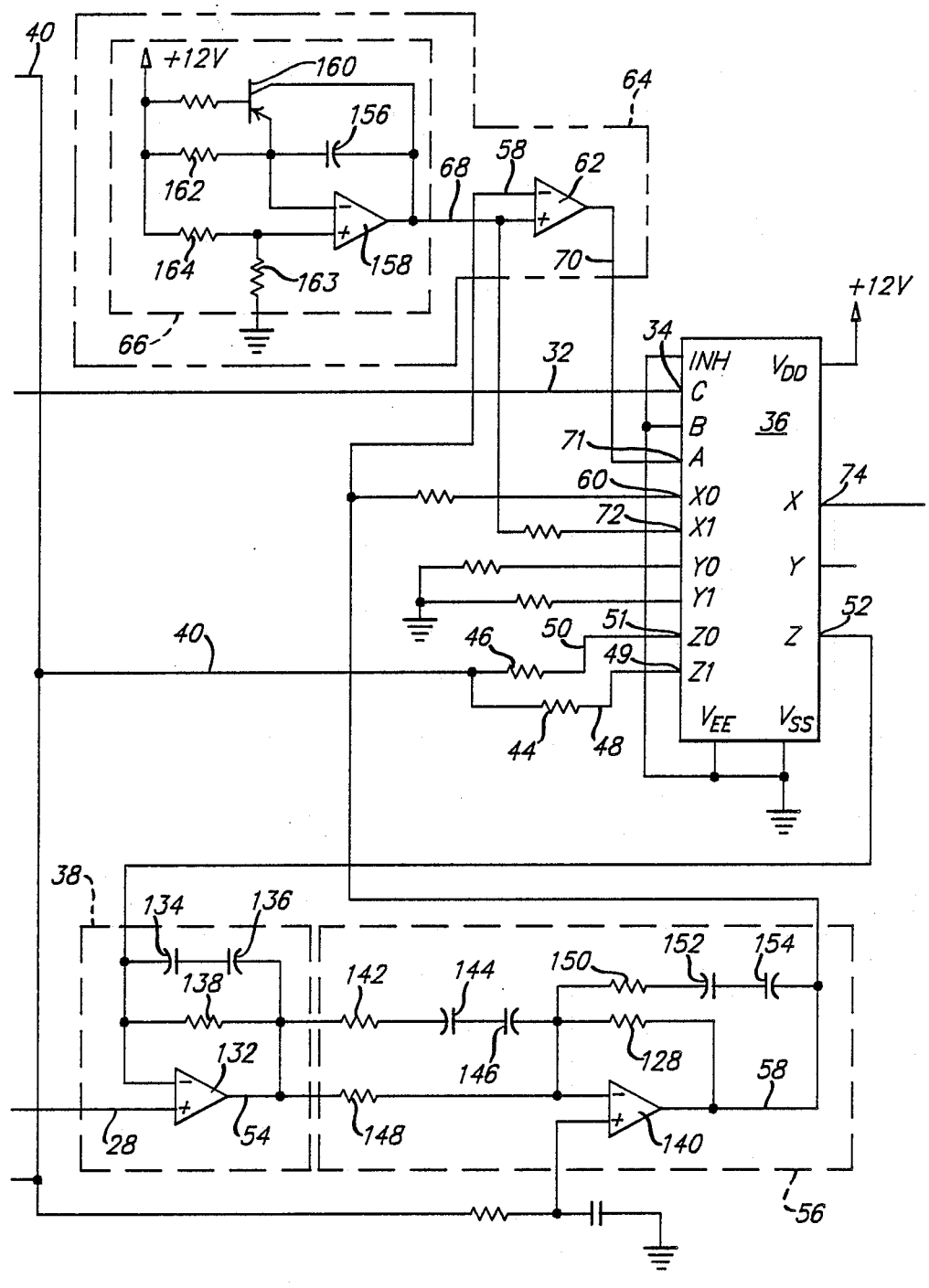
FIG. 3 is a schematic diagram of the prefilter, the differentiator/integrator, the digital switch, the slow start ramp network and the high and low gain elements.

Referring specifically to FIGS. 2 and 3, the output 32 of the error range comparison circuitry 30 is coupled to selection input 34 of the digital switch 36. If output 32 is at a logic one level, the digital switch 36 operates to couple selection input 49 with output 52 of the switch 36. When output 32 is at a logic zero level, the switch 36 couples input 51 to output 52.

The system reference signal 40, which acts as a level shifter, represents a voltage of about 6 volts. After being buffered by buffer 130 the system reference signal 40 is applied to the high gain element 44, represented as a resistor, to produce high gain signal 48 and to the low gain element 46, also represented as a resistor, to produce low gain signal 50. High and low gain signals 48 and 50 are then coupled to inputs 49 and 51 respectively of the digital switch 36.

Output 52 of switch 36, which represents either a high or low gain signal 48 or 50 respectively, is coupled to the inverting input of an operational amplifier 132 of the prefilter 38. The error signal 28 is coupled to the non-inverting input of the op-amp 132. Included in the prefilter 38 are capacitors 134 and 136 which operate to filter positive and negative going voltage spikes which may be produced when switching between the high and low gain resistors 44 and 46 respectively In this regard, i&: should be understood that capacitors 134 and 136 are optional and merely help to enhance the stability of the overall system 10.

Further included in the prefilter 38 is resistor 138 which, in connection with the selected gain signal 48 or 50, helps configure the op-amp 132 to provide either a first, or high, gain signal, or a second, or low, gain signal.

The output 54 of the operational amplifier 132 represents an amplified correction signal representative of the difference between the actual water temperature and the selected water temperature, amplified by either a high or low gain. Thus, prefilter 38 may be configured by selectively coupling either resistor 44 or resistor 46, in accordance with the magnitude of error signal 28, through digital switch 36 to the inverting input of op-amp 132 to provide either a high or gain. By providing this "dual-gain" selection capability, the prefilter 38 can be configured to provide a low gain when error signal 28 is outside of the predetermined error range (i.e., when the difference between the sensed and desired temperatures is greater than $+/-3°$ F.), and a high gain when the error signal 28 is within the predetermined error range. The dual-gain selection capability of the system 10 is a principal factor in providing closer and more precise regulation of the temperature of water output by the heat exchanger 18. By selecting a low gain when the error signal indicates a relatively large variance between the sensed and selected water temperatures, i.e., greater than $+/-3°$ F., the overshoot by the system 10, which would likely result if only a high gain was used for the system 10, is substantially reduced. This contributes to better stability of the system 10 by reducing the oscillations the system 10 could otherwise experience before the water is brought to the selected temperature. Switching to a high gain once the water temperature is within $+/-3°$ F. of the selected temperature allows the system 10 to react more quickly to changes in the sensed water temperature, thereby providing more precise regulation of the water temperature.

Amplified correction signal 54 is input to the inverting input of an operational amplifier 140 of the differentiator/integrator 56. Resistor 142, capacitor 144, capacitor 146 and resistor 148, together With op-amp 140, comprises the differentiator portion of the differentiator/integrator 56 and operate as a "look-ahead" device to "trim" or reduce slightly the amplified correction signal 54 when the signal 54 changes rapidly in either a positive or negative direction.

The integrator of the differentiator/integrator 56 consists of resistor 148, resistor 150, capacitors 152 and 154 and resistor 128. The integrator section operates to generate the conditioned correction signal 58 which is the time integral of the amplified correction signal 54 being output from the prefilter 38. In other words, the integrator section operates to continuously sum the amplified correction signal 54 to produce an output 58 which represents roughly a sinusoidal waveform of varying frequency and magnitude. The conditioned correction signal 58 will be discussed further in connection with FIG. 6.

The conditioned correction signal 58 is coupled to the inverting input of the comparator 62 of the slow start ramp network 64 and to input 60 of the digital switch 36. The slow start ramp output 68 from the slow start ramp generator 66 is input to the non-inverting input of the comparator 62 and the output signal 70 of the comparator 62 is coupled to selection input 71 of the digital switch 36.

The slow start ramp network 64 operates as follows. When power is initially applied to the system 10, operational amplifier 158 provides a maximum output in the range about 7 to 8 volts. Capacitor 156 also begins charging and gradually causes the output of operational amplifier 158 to decrease in a ramp-like fashion to a small positive voltage. The slow start ramp network 64 thus provides a slow start control signal in the form of ramp output 68 which gradually decreases from a maximum positive to a minimum positive voltage. When power is removed from the system 10, a PNP transistor 160 becomes forward biased allowing capacitor 156 to discharge. Thus, the slow start ramp network 64 serves to provide a ramp input 68 when the system 10 is initially powered on which is compared against the conditioned correction output 58 from the integrator/differentiator 56. The comparator 62 compares the conditioned correction signal 58 with the ramp signal 68. When the system 10 is first powered on and a relatively large error signal 28 is generated, the ramp signal 68 will be more positive than the conditioned correction signal 58. This causes the comparator 62 to provide output 70, which will represent a logic one level signal, to selection input 71 of the digital switch 36 A logic one on selection input 71 selects input 72, thereby coupling the ramp signal 68 to output 74 of the switch 36. The ramp signal 68 remains coupled to output 74 of the switch until the conditioned correction signal becomes more positive than the ramp signal 68, which does not occur for preferably at least about 1-5 seconds The 1-5 second time period may be increased or decreased in accordance with the requirements of specific applications by simply varying the values of capacitor 156 and resistor 162.

When the conditioned correction signal 58 becomes more positive than the ramp signal 68, the output 70 of comparator 62 will switch to a logic zero level signal, which causes selection input 71 to couple input 60 with output 74 of the switch. Therefore, by comparing the magnitude of the ramp signal 68 with the magnitude of the conditioned correction signal 58, the slow start ramp network 64 operates to controllably inhibit the conditioned correction output 58 when the system 10 is first powered on and the signal 58 has a negative or small positive value, indicating current must be applied to the heat exchanger 18 (shown in FIG. 1). The slow start ramp network 64 also operates to enable the ramp signal 68 to be coupled to output 74 of the digital switch 36 in lieu of the conditioned correction signal 58 when power is initially applied to the system, thus avoiding a sudden application of a large amount of current to the heat exchanger 18 The ramp signal 68 thus operates to gradually enable current flow to the heat exchanger 18 over a predetermined time and to pass control to the conditioned correction signal 58 when the signal 58 reaches a predetermined value.

Although the slow start ramp network 64 is optional, it provides several advantages over present water heater control systems. For one, by gradually applying current to the heat exchanger 18 at power up, rather than applying full current, i.e., up to 75 amps or more, instantaneously, the life of the heating elements within the heat exchanger 18 will be extended. Transformers and other components of the utility supplying the power will also benefit because current spikes will be reduced or eliminated. Also, the operability of the system 10 in high density residential installations such as motels and apartments will be improved since numerous and substantially simultaneous start ups of the system will not tax as heavily the utility supplying power to the installation.

Figure 4:
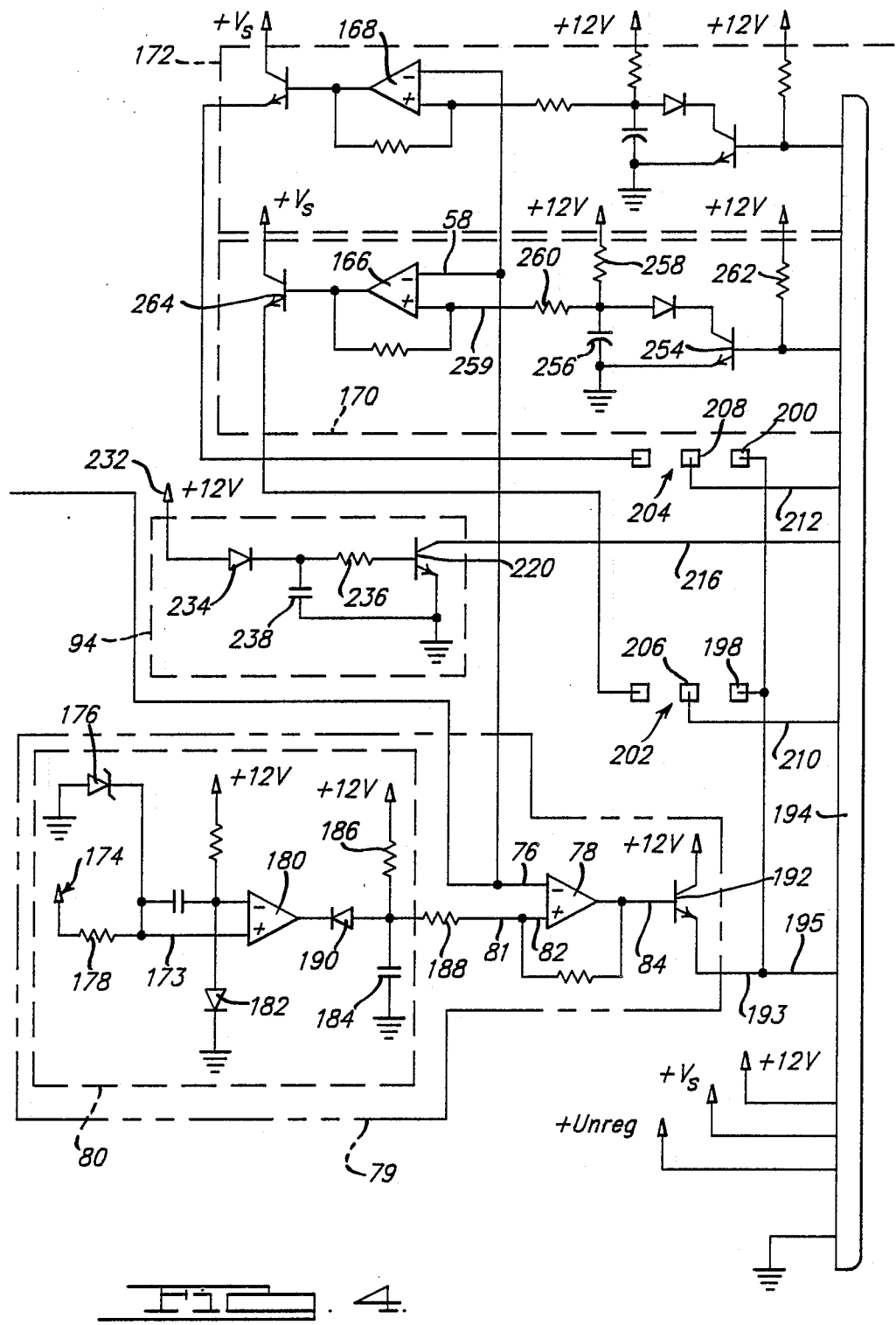
FIG. 4 is a schematic diagram of the first switching circuit and portions of the second and third switching circuits.

With reference to FIG. 4, the output 74 of the digital switch 36 is coupled to the inverting inputs of comparators 78, 166 and 168 of first, second and third switching networks 79, 170 and 172 respectively. It should be understood that switching circuits 170 and 172 have been illustrated only to show a complete switching network for a three-phase power system. If the system 10 is to be used with a single phase power system, then only switching circuit 79 is needed.

Beginning with the first switching circuit 79, a full-wave rectified 60 Hz signal having a magnitude of preferably about +18 volts is received at input 174 of the ramp generator 80 from the secondary of a step-down transformer. The step-down transformer is well known in the art and therefore has not been illustrated in FIG. 4. The +18 volt signal is clipped at preferably about +10 volts by the zener diode 176. Resistor 178 and the zener diode 176 operate together to absorb the clipped, or unused power. The clipped, +10 volt signal 173 is then coupled to the non-inverting input of a comparator 180. The comparator 180 also has a reference signal of preferably about +0.6 volts applied on its inverting input, the +0.6 volts being the voltage drop across diode 182. When the +10 volt signal 173 exceeds the 0.6 volt signal, comparator 180 generates a logic one level output which allows capacitor 184 to begin charging through resistor 186. As capacitor 184 charges, a voltage ramp having an initial magnitude of about 0.6 volts will be applied through resistor 188 to the non-inverting input of comparator 78. When the +10 volt, full-wave signal 173 becomes less than the 0.6 volt signal applied to the inverting input of comparator 180, comparator 180 generates a logic zero level output signal (i.e., 0.6 volts). This allows capacitor 184 to discharge through diode 190 and the current through resistor 186 to also pass through the diode 190 to ground, thus placing a logic zero level signal (i.e., 0.6 volts) on the non-inverting input of comparator 78. Thus, as the +10 volt, full-wave rectified signal 184 increases and decreases in magnitude, comparator 180 enables capacitor 194 to controllably charge and discharge to generate the ramp reference signal 81.

The ramp reference signal 81 is continuously compared against either the ramp output 68 from the slow start ramp network 64 or the conditioned correction signal 58 from differentiator/integrator 56, depending upon which one has been selected by the ramp selection signal 70. For purposes of illustration, it will be assumed that the system has been operating for longer than about 5 seconds, in which case the conditioned correction signal 58 will be supplied to the inverting input 76 of comparator 78. The comparator 78 provides switching signal 84, which has a logic one level whenever the ramp reference signal 81 on the non-inverting input of comparator 78 is larger in magnitude than the conditioned correction signal 58. The switching output 84 is coupled to the base of an NPN switching transistor 192. The logic one level switching signal 84 forward biases the emittor-base junction of the transistor 192 which allows a signal !93 having a logic one level to be sent through line 195 of a connector 194. When the conditioned correction signal 58 exceeds the magnitude of the ramp reference signal, the switching signal 84 generated by comparator 78 will switch to a logic zero level and reverse bias the emitter-base junction of switching transistor 192, thus disabling current flow through the transistor 192 and the connector 194, and dropping signal 193 to a logic zero level.

The turn-on/off switching signal 84 generated by the comparator 78 of the switching network 79 thus serves to provide a square wave-like train of output pulses of varying widths to enable and disable the switching transistor 192. The output of comparator 78 and switching transistor 192 will be shown and discussed further in connection With the waveforms of FIG. 6.

The turn-on/off switching signal 193 generated by switching transistor 192 is also coupled to the first legs 198 and 200 of jumpers 202 and 204 respectively. Jumpers 202 and 204, it will be understood, are only needed when the system 10 is to be used with a three-phase power system. Second legs 206 and 208 of jumper assemblies 202 and 204 respectively connect with the first legs 198 and 200 to allow the turn-on/off switching signal 193 to be sent through the connector 194 via lines 210 and 212.

Referring specifically now to FIGS. 4 and 5, when the turn-on/off switching signal 193 of transistor 192 is at a logic one level, current will flow through lines 195, 210 and 212, through the light emitting diodes (LEDs) 214, 225 and 227 of photo-triacs 86, 224 and 226 respectively, and through line 216 to the collector of transistor 220 of the master power-down circuitry 94. The turn-on/off switching signal 193 illuminates the LEDs 214, 225 and 227 and switches on photo-triacs 86, 224 and 226. The photo-triacs 86, 224 and 226 each generate a signal to the gate 222, 235 and 237 of their respective main power triac 90, 228 and 230, thus switching on the triacs 90, 228 and 230 and enabling current flow from lines L1, L2 and L3 of a three-phase AC generator (not shown), through heating elements 213, 229 and 231 within the heat exchanger 18, and through triac 90. When the turn-on/off switching signal 193 of transistor 192 is a logic zero, the LEDs 214, 225 and 227 of photo-triacs 86, 224 and 226 will turn off, thereby disabling the photo-triacs 86, 224 and 226 and the main power triacs 90, 228 and 230. Current flow through the heating elements 213, 229 and 231 within the heat exchanger 18 will then be interrupted, thus allowing the heat exchanger 18 and the water flowing through it to begin cooling. It should be appreciated that photo-triacs 86, 224 and 226 are optional and have been included merely to enhance the isolation of the system 10. Also, the heat exchanger 18 could contain either a greater or lesser number of heating elements than the three illustrated in FIG. 5, depending on the maximum current carrying capability of each triac 90, 228 or 230.

The system 10 thus acts as a closed loop control system to automatically modulate current flow to the heat exchanger 18 to rapidly and continuously correct for differences between the sensed and selected water temperatures. The closed loop design of the system further automatically compensates for varying flow rates which could otherwise affect the temperature regulation of the water flowing through the heating device 12.

Another advantage of the system 10 is that current is applied to the heating elements 213, 229 and 231 within the heat exchanger 18 only when needed. This results in significant improvements in efficiency, in some applications as much as 100%. For example, while a family has left on a vacation, a tank-type hot water system would normally continue to maintain the water in a holding tank at a relatively high temperature, even though no hot water will be needed for several days, or even weeks. Therefore, electrical power will be consumed to maintain the water in a heated state even though no hot water is needed during this time period. With the present invention, electrical power is only consumed while water is actually being drawn. Accordingly, no power at all would be drawn during the period of non-use.

The system 10 is further capable of heating water passing through the heat exchanger 18 very quickly. For example, at a flow rate of about two gallons per minute, and with an AC generator supplying a 208 volt, 0-75 amp input to the heat exchanger 18, the water temperature can be raised from about 42°-52° F. to about 102°-112° F. - an increase of roughly about 60° F. — within about 25 seconds.

Returning now to FIGS. 4 and 5, when a logic one is present on line 195 and photo-triacs 86, 224 and 226 and power triacs 90, 228 and 230 are switched on, the turn-on/off switching signal 193 is coupled via line 216 to the collector of NPN transistor 220 of the master power-down circuitry 94. The master power-down circuitry 94 includes diode 234, resistor 236 and capacitor 238, and operates to forward bias the base of transistor 220 via a unregulated positive voltage applied at 232. The positive unregulated voltage also operates to charge capacitor 238 when the system 10 is initially powered on. The forward biasing of transistor 220 thus allows a complete path to ground for the turn-on/off switching signal 193 of line 216. When the system 10 is powered down, the master power-down circuitry 94 operates to quickly interrupt current flow through line 216 by allowing capacitor 238 to discharge through resistor 236 and maintain transistor 220 in a forward biased condition momentarily. By maintaining transistor 220 in a forward biased condition for a brief time after power is removed from the system 10, voltage spikes which could otherwise occur if power was gradually removed from the system 10 are eliminated.

The second switching circuit 170 is somewhat similar in operation to that of the first switching circuit 79 and will now be discussed. Since the operation of the third switching circuit 172 is identical to that of the second switching circuit 170, circuit 172 will not be discussed. When the system 10 is powered on, an LED 240 of a phase reference photo-triac 242 is illuminated, thus switching on the phase reference photo-triac 242. When the triac 242 switches on, phases two and three of the three-phase power source (i.e., AC generator 91) are connected and current flows through line 244, LEDs 246 of optical isolator 248 and through resistor 250. The current flow illuminates the LEDs 246 which forward biases photo-transistor 252 of the optical isolator 248, thus pulling the base of transistor 254 of the second switching circuit 170 to ground. At this point, transistor 254 is reverse biased which allows capacitor 256 to charge through resistor 258 and place a positive-going ramp reference voltage 259 through resistor 260 on the non-inverting input of comparator 166. When the sinusoidally varying current on line 244 is zero, LEDs 246 will turn off, thereby reverse biasing photo-transistor 252, whereby transistor 254 will be forward biased by current through resistor 262. Capacitor 256 then discharges through transistor 254 to ground and the ramp signal 259 on the non-inverting input of comparator 166 decreases in magnitude until the optical isolator 248 is switched on again.

Comparator 166, like comparator 78, compares the conditioned correction signal 58 with the value of the ramp signal 259 and provides a logic one output to transistor 264 when the ramp signal 259 exceeds the conditioned correction signal 58 in magnitude. Transistor 264 then allows a current flow through jumper assembly 202 to the second photo-triac 224.

Referring now to FIG. 6, an example of the clipped, +10 volt full-wave signal 173 applied to the non-inverting input of comparator 180 is shown. The ramp reference signal 81 generated by ramp generator 80 of switching circuit 79 is also illustrated in FIG. 6 together with an example of a highly varying conditioned correction signal 58. An example of the turn-on/off switching signal 193 is also shown illustrating how the pulse-width of the signal may vary widely depending upon the difference between the sensed and selected water temperature. Further shown is an example of a single phase of a 208 volt, 60 Hertz, three-phase input signal 265 from the AC power generator 91 indicating in cross-hatched sections 266 the time intervals during which current will be flowing through main power triac 90.

From FIG. 6 it can be seen that the turn-on/off switching signal 193 will be at a logic zero level, for example zero volts, whenever the conditioned correction signal 58 is larger in magnitude than the ramp reference signal 81. During these time intervals, triacs 86 and 90 will be switched off, thus interrupting current flow to the heat exchanger 18 and allowing the water passing through the water heater 12 to cool. In comparing the time intervals during which the ramp reference signal 81 is greater in magnitude than the conditioned correction signal 58, it can be seen that the turn-on/off switching signal 193 will be at a logic one level, for example 5 volts, thus switching on triacs 86 and 90 and allowing current to flow to the heat exchanger 18 to heat water flowing therethrough. From FIG. 6 it can also be seen how the width of the pulses of the turn-on/off switching signal 193 may vary widely in response to a rapidly changing conditioned correction signal 58.

Preferred values and/or part numbers for the various components of the system 10 are as follows:

| Reference Numeral | Value and/or Part No. |
| --- | --- |
| 14 | LM34 (National Semiconductor) |
| 22, 24, 26 | LM324 |
| 36 | CD4053 |
| 44 | 8.08k |
| 46 | 3.315k |
| 62, 78 | LM324 |
| 86 | M0C3020 |
| 90 | SC160D |
| 98 | 3.32k, 1% |
| 100 | 909 Ohm |
| 102 | 301 Ohm |
| 104, 106 | 200 Ohm |
| 112, 114 | LM324 |
| 116 | 10k |
| 118, 120 | 360 Ohm |
| 122 | 10k |
| 128 | 2.7M |
| 130, 132 | LM324 |
| 134, 136 | 100 UF |
| 138 | 20k |
| 142 | 10.55k |
| 144, 146 | 33 UF |
| 148 | 504k |
| 150 | 103.2k |
| 152, 154 | 150 UF |
| 158 | LM324 |
| 160 | TN2907 |
| 162 | 750k |
| 164 | 10k |
| 166, 168 | LM358 |
| 176 | 1N5927A |
| 178 | 100 Ohm, ¼ W |
| 182 | 1N4001 |
| 184 | 0.47 UF |
| 186 | 22k |
| 188 | 10k |
| 190 | 1N4001 |
| 192 | 2N6714 |
| 212 | 620 Ohm, ¼ W |
| 220 | PN2222 |
| 224, 226 | M0C3020 |
| 228, 230 | SC160D |
| 234 | 1N4001 |

-continued

| Reference Numeral | Value and/or Part No. |
| --- | --- |
| 236 | 10k |
| 238 | 1 UF |
| 242 | MOC3020 |
| 248 | H11AA2 |
| 250 | 5K3W |
| 254 | PN2222 |
| 256 | 0.47 UF |
| 258, 262 | 22k |
| 260 | 10k |
| 262 | N6714 |

The temperature control system 10 of the present invention provides a means by which current may be instantaneously and precisely applied to a heating element of a tankless water heater 12. Specifically, the dual gain control provided by the system 10 helps to provide even more precise temperature control over water passing through the water heater 12 than heretofore possible. The system 10 also provides the advantage of a slow start ramp network which operates to apply current. more gradually to the heating element(s) of the water heater 12. The gradual application of current to the heating element(s) helps eliminate damage to the element by large current spikes which would normally otherwise be present if full power was instantaneously applied to the heat exchanger 18 upon power-up. The system 10 further incorporates a master power-down circuit 94 which operates to quickly interrupt current flow to the heat exchanger 18 after the system is powered down, thereby helping to eliminate current spikes which could occur if power was gradually removed from the system 10.

While the present invention has been described in connection with particular examples thereof, it should be appreciated that modifications apparent to those skilled in the art may be made to the invention without departing from thte true and fair scope of the subjoined claims.

What is claimed is:

1. An electronic temperature control system for controlling heat generated by a heating element in a tankless liquid heater, said system comprising:
   temperature sensing means for enabling real-time sensing of a temperature level of a liquid and providing a first output signal representative of said temperature level;
   temperature selection means for enabling a selected temperature level of said liquid and providing a second output signal representative of said selected temperature level;
   error signal generating means responsive to said first and second output signals for generating an error signal representative of a difference between said first and second output signals;
   error range comparison means responsive to said error signal for providing a predetermined error range which corresponds to a predetermined maximum desirable temperature level error range, comparing said error signal with said predetermined error range and providing a first gain selection signal when said error signal is within said predetermined error range and a second gain selection signal when said error signal is outside of said error range;
   first and second gain elements responsive to said system reference signal, said first and second gain elements providing first and second gain signals respectively, said first gain signal operating to help provide a first gain and said second gain signal operating to help provide a second gain, said first gain being greater than said second gain;
   first switch means responsive to said first and second gain signals and said first and second gain selection signals for selecting either said first or second gain signals;
   amplifier means responsive to said first switch means and said error signal for generating a conditioned correction signal having either said first or said second gain;
   first switching circuit means responsive to said conditioned correction signal for continuously comparing said conditioned correction signal with a predetermined reference signal and generating a first output when said reference signal is greater than said conditioned correction signal and a second output when said reference signal is less than said conditioned correction signal; and
   second switch means responsive to said first and second outputs for selectively enabling a current flow through said heating element of said heater in intermittent fashion, thereby controllably heating said liquid and maintaining the temperature level of said liquid at said selected temperature level.

2. The system of claim 1, further comprising slow start control means for controllably inhibiting the application of said conditioned correction signal to said first switch means when said system is initially powered on and outputting to said second switch means in lieu of said conditioned correction signal a temporary, slow start control signal, said slow start control signal being operable to gradually and controllably enable said second switch means initially for brief periods of time only and subsequently for longer periods of time, thereby causing said second switch means to enable current flow to said heating element in a gradual, controlled fashion; and
   said slow start control means further being operable to inhibit said slow start control signal after said conditioned correction signal has reached a predetermined level and enable said conditioned correction signal, thereby passing control over said second switch means from said slow start control signal to said conditioned correction signal.

3. The system of claim 2, wherein said slow start control means comprises:
   a ramp generator for generating a ramp signal; and
   a comparator for receiving and comparing said ramp signal and said conditioned correction signal, said comparator being operable to generate an output signal indicative of whether said conditioned correction signal has exceeded said predetermined level.

4. The system of claim 1, further comprising prefilter means interposed between said error signal generating means and said first amplifier means and responsive to said error signal generating means and said first and second gain selection signals for amplifying said error signal and filtering said gain selection signals to generate an amplified correction.

5. The system of claim 1, further comprising means for quickly interrupting current flow through said second switch means when power is removed from said system.

6. The system of claim 1, further comprising optical isolation means interposed between said first switching circuit means and said second switch mean for optically isolating said first and second outputs from said second switch means.

7. The system of claim 1, wherein said temperature sensing means comprises a temperature sensing integrated circuit.

8. The system of claim 1, wherein said temperature selection means comprises a potentiometer.

9. The system of claim 1, wherein said error signal generating means comprises a differential amplifier.

10. The system of claim 1, wherein said error range comparison means comprises:
a voltage divider operable to provide upper and lower reference voltage limits;
an upper limit comparator responsive to said upper reference voltage limit and said error signal for generating an upper limit output signal indicative of whether said error signal is greater or less than said upper reference voltage limit; and
a lower limit comparator responsive to said lower reference voltage limit and said error signal for comparing said lower reference voltage limit and said error signal and generating a lower limit output signal indicative of whether said error signal is greater or less than said lower reference voltage limit, thereby defining said predetermined error range.

11. The system of claim 1, wherein said first gain element comprises a first resistor operable to help provide said first gain and said second gain element comprises a second resistor operable to help provide said second gain.

12. The system of claim 1, wherein said second switch means comprises a main power triac.

13. An electronic temperature control system for controlling current flow to a heating element in a tankless, liquid water heater, said system comprising:
a temperature sensing device in fluid communication with a liquid to be temperature controlled, said temperature sensing device being operable to enable real-time sensing of a temperature level of said liquid and to provide a first output signal representative of said sensed temperature level;
an operator controllable temperature selection device for enabling operator selection of a desired temperature level of said liquid and providing a second output signal representative of said selected temperature level;
a differential amplifier responsive to said first and second output signals for generating an error signal representative of a difference between said first and second outputs;
error range comparison circuitry for providing an upper reference signal limit and a lower reference signal limit, said limits defining a predetermined, maximum desirable error range which corresponds to a maximum desirable temperature level error range, said error range comparison circuitry further including an upper limit comparator responsive to said upper limit signal and said error signal and a lower limit comparator responsive to said lower limit signal and said error signal, said upper limit comparator being operable to provide an upper limit output indicative of when said error signal is greater or less than said upper limit signal, and said lower limit comparator being operable to provide a lower limit output signal indicative of whether said error signal is greater or less than said lower limit reference signal, said upper and lower limit outputs operating cooperatively to provide a high gain selection signal when said error signal is within said predetermined error range and a low gain selection signal when said error signal is outside of said predetermined error range;
reference signal means for generating a system reference signal;
first and second gain elements responsive to said system reference signal, said first gain element providing a first gain signal, said second gain element providing a second gain signal, said first gain signal being greater than said second gain signal;
digital switch means responsive to said first and second gain signals and said upper and lower gain selection signals, for selecting either said first or second gain signals;
first amplifier means responsive to said digital switch means and said error signal for generating a filtered, amplified correction signal having either said first or said second gain;
second amplifier means responsive to said system reference signal and said filtered, amplified correction signal for generating a conditioned correction signal, said digital switch means being responsive to said conditioned correction signal;
ramp generator means for generating a ramp signal of predetermined magnitude and frequency;
comparison means responsive to said ramp signal and said conditioned correction signal for comparing said ramp and conditioned correction signals and generating a switching signal indicative of whether said ramp signal is greater or less than said conditioned correction signal; and
second switch means responsive to said switching signal for selectively enabling a current flow from a current source to flow through said second switch means and through a heating element to thereby heat said heating element, thereby controllably heating said liquid in fluid contact with said heating element.

14. The system of claim 13, further comprising:
a slow start ramp generator for generating a slow start ramp signal; and
comparison means for comparing said slow start ramp signal and said conditioned correction signal and generating a selection signal indicative of whether said conditioned correction signal is greater or less than said slow start ramp signal, said digital switch means further being responsive to said output signal and said conditioned correction signal and said second ramp signal and operable to enable said slow start ramp signal and inhibit said conditioned correction signal when said selection signal indicates that said slow start ramp signal is greater than said conditioned correction signal, said comparison means further being operable to inhibit said slow start ramp signal and enable said conditioned correction signal if said conditioned correction signal becomes greater than said slow start ramp signal.

15. The system of claim 13, further comprising means for receiving said second switching signal and quickly and controllably disabling said second switch means when power is removed from said system, thereby helping facilitate elimination of transients generated by said second switch means when said power is removed from said system.

16. The system of claim 15, wherein said second switch means comprises a triac.

* * * * *